(12) United States Patent
Lee et al.

(10) Patent No.: US 9,697,069 B2
(45) Date of Patent: Jul. 4, 2017

(54) PROVIDING A REMOTE DIAGNOSIS FOR AN INFORMATION APPLIANCE VIA A SECURE CONNECTION

(71) Applicant: INTERNATIONAL BUSINESS MACHINES CORPORATION, Armonk, NY (US)

(72) Inventors: Cheng-Ta Lee, Taipei (TW); Jeffrey C H Liu, Taipei (TW); Joey H Y Tseng, Taipei (TW); Rick M F Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/471,388

(22) Filed: Aug. 28, 2014

(65) Prior Publication Data

US 2015/0067402 A1    Mar. 5, 2015

(30) Foreign Application Priority Data

Aug. 30, 2013    (TW) .............................. 102131465 A (51) Int. Cl.

| G06F 11/07 | (2006.01) |
| G06F 21/60 | (2013.01) |
| H04L 12/24 | (2006.01) |
| H04L 12/26 | (2006.01) |
| H04L 29/06 | (2006.01) |

(52) U.S. Cl.
CPC ........ *G06F 11/079* (2013.01); *G06F 11/0748* (2013.01); *G06F 21/606* (2013.01); *H04L 41/28* (2013.01); *H04L 43/50* (2013.01); *H04L 63/0428* (2013.01); *H04L 63/10* (2013.01); *H04L 63/102* (2013.01)

(58) Field of Classification Search
CPC .. G06F 21/606; G06F 11/079; G06F 11/0748; G06F 11/22; H04L 63/10
See application file for complete search history.

(56) References Cited

U.S. PATENT DOCUMENTS

| 4,680,788 A | * | 7/1987 | Cordeiro | ............. G06F 13/4063 |
| | | | | 379/93.09 |
| 5,276,863 A | * | 1/1994 | Heider | ................ G06F 11/2294 |
| | | | | 709/222 |
| 5,455,926 A | * | 10/1995 | Keele | .................... G06F 3/0601 |
| | | | | 711/112 |
| 5,491,791 A | * | 2/1996 | Glowny | .............. G06F 11/0709 |
| | | | | 714/26 |
| 5,506,955 A | * | 4/1996 | Chen | ................... G06F 11/3414 |
| | | | | 714/26 |

(Continued)

*Primary Examiner* — Hadi Armouche
*Assistant Examiner* — Shahriar Zarrineh
(74) *Attorney, Agent, or Firm* — Law Office of Jim Boice (57) ABSTRACT

A processor-implemented method provides a remote diagnosis for an information appliance via a secure connection. A command is received from a console, and an examination is performed to determine whether or not the command is permitted to be issued. In response to a remote diagnostic module being initiated, a determination is made as to whether a secure connection to a remote information appliance has been created. In response to determining that the secure connection to the remote information appliance has been created, the command is transmitted to the remote information appliance via the secure connection.

9 Claims, 6 Drawing Sheets

(56) References Cited

U.S. PATENT DOCUMENTS

| | | | | |
|---|---|---|---|---|
| 5,827,461 | A * | 10/1998 | Feltman | B29C 47/0019 156/244.11 |
| 6,023,507 | A * | 2/2000 | Wookey | G06F 11/2294 380/285 |
| 6,112,276 | A * | 8/2000 | Hunt | G06F 3/061 711/112 |
| 6,233,634 | B1 * | 5/2001 | Clark | G06F 11/0709 307/66 |
| 6,539,338 | B1 * | 3/2003 | Pickreign | G06F 11/27 455/115.1 |
| 6,763,458 | B1 * | 7/2004 | Watanabe | G06F 9/441 713/100 |
| 6,944,793 | B1 | 9/2005 | Parker | |
| 7,620,057 | B1 * | 11/2009 | Aloni | G06F 12/0804 370/395.7 |
| 8,134,928 | B1 * | 3/2012 | Manickavasagam | H04L 1/24 370/242 |
| 2003/0065986 | A1 * | 4/2003 | Fraenkel | G06F 11/3006 714/47.2 |
| 2004/0123153 | A1 * | 6/2004 | Wright | G06F 21/32 726/1 |
| 2005/0050189 | A1 * | 3/2005 | Yang | H04L 12/2697 709/223 |
| 2006/0094400 | A1 * | 5/2006 | Beachem | H04L 63/101 455/410 |
| 2006/0120526 | A1 * | 6/2006 | Boucher | G06F 21/6218 380/247 |
| 2006/0136784 | A1 * | 6/2006 | Prescott | G06F 11/0748 714/38.11 |
| 2006/0136972 | A1 * | 6/2006 | Metzger | G08B 13/19689 725/105 |
| 2006/0233114 | A1 * | 10/2006 | Alam | H04L 41/069 370/252 |
| 2007/0055780 | A1 * | 3/2007 | Cartes | H04L 12/2602 709/227 |
| 2008/0022133 | A1 * | 1/2008 | Sobel | G06F 21/6218 713/193 |
| 2008/0033940 | A1 * | 2/2008 | Dinh | G06F 17/30392 |
| 2008/0126858 | A1 * | 5/2008 | Barras | G06F 11/327 714/25 |
| 2008/0250492 | A1 * | 10/2008 | Hazard | H04L 63/0272 726/15 |
| 2009/0010190 | A1 * | 1/2009 | Gong | H04L 45/26 370/311 |
| 2009/0222907 | A1 * | 9/2009 | Guichard | G06F 21/6227 726/17 |
| 2010/0138696 | A1 * | 6/2010 | Dehaan | G06F 11/2294 714/37 |
| 2011/0029341 | A1 * | 2/2011 | Muse | G06Q 10/063 705/7.11 |
| 2011/0066909 | A1 * | 3/2011 | Skirmont | H04B 10/40 714/746 |
| 2011/0106520 | A1 * | 5/2011 | Emerson | H04L 12/24 703/25 |
| 2011/0141921 | A1 * | 6/2011 | Reese | H04L 41/5032 370/252 |
| 2013/0185761 | A1 * | 7/2013 | Friel | H04H 60/32 725/139 |
| 2015/0070585 | A1 * | 3/2015 | Sharif-Ahmadi | G08C 17/02 348/564 |
| 2016/0140776 | A1 * | 5/2016 | Ricci | G06F 9/54 701/31.4 |

* cited by examiner

PROVIDING A REMOTE DIAGNOSIS FOR AN INFORMATION APPLIANCE VIA A SECURE CONNECTION

BACKGROUND

The present invention is related to a technology of a remote diagnosis, and in particular, to a method and a computer program product for providing a remote diagnosis for an information appliance via a secure connection and an information appliance for performing the method.

An information appliance, also known as an Internet Appliance, is usually built-in with networking capability and is a device capable of performing a specific function, such as a gateway, a router, an attached network storage, an access point, a digital TV set top box, or a web-based file sharing server. The conventional appliances can be referred to IBM® WebSphere® DataPower Series SOA Appliances, or Tivoli® ISS Appliances, wherein "IBM", "WebSphere", and "Tivoli" are registered trademarks own by International Business Machine in the United States and/or the other countries.

Unlike general-purpose computer devices, information appliances are designed to serve a specific purpose or provide a specific service so as to carry out a specific transaction and have high performance. Unlike general-purpose computer devices, information appliances are relatively closed, as they operate by means of a specific operating system and applications (or drivers) in accordance with the intended purpose and service.

A cluster which consists of a plurality of information appliances and is characterized by reliability, availability & serviceability (RAS) is important for the configuration of information appliances in order to ensure that a plurality of servers or information appliances can meet business needs. The aforesaid feature is especially true to those information appliance products which function as the enterprises' processing units located at a demilitarized zone (DMZ).

The network interface card (NIC) of a typical information appliance is usually equipped with an administrative port or a serial port via which a network system administrator diagnoses a system-related problem or failure. In general, the network interface card provides a system on chip (SOC) or an application-specific integrated circuit (ASIC) to build a TCP/IP connection with a TCP/IP stack. By means of the TCP/IP stack, the information appliance can create the TCP/IP connection regardless of the operating system of the information appliance. After connecting to the administrative port or the serial port, the network system administrator carries out diagnosis and troubleshooting via a console starts the operating system of the information appliance.

For the sake of security, the administrative port or the serial port is seldom (remotely) accessible to ordinary users. If an information appliance crashes and thus fails or is confronted with a system-related problem, i.e., a malfunctioning system, the administrator will have to enter the server machine room and log in to the information appliance directly via the administrative port or the serial port so as to carry out diagnosis and troubleshooting. Hence, it is advantageous to allow the administrator to remotely diagnose a problem in a convenient and secure manner.

However, it is not an easy task to remotely diagnose a failed information appliance. This is particularly true when the information appliance is located at a DMZ and serves as a reverse proxy for transmitting client data to a subsequent network server for a backend application, because it is likely to confront an apparatus (such as a firewall, an intrusion detection system (IDS), or an intrusion prevention system (IPS)) which exists in the DMZ and performs network security. Accordingly, it is more difficult to carry out remote diagnosis in the DMZ. Owing to a lack of facilities of remote diagnosis, a technical support engineer has to physically access the failed information appliance, and thus the technical support engineer or a service team must be dispatched to a data center at a client end to execute routines of basic maintenance services. Furthermore, prolonged downtime of a failed system imposes a great impact on business.

Solutions are available nowadays to perform diagnosis, for example, leveraging an additional hardware module, such as an integrated management module (IMM), for accessing the failed information appliance as a system kernel procedure is down. The IMM provides system administration functionality by means of IPMI 2.0. Nonetheless, the aforesaid technique is not applicable to the information appliances located at the DMZ or the information appliances with high security requirements. In the DMZ, various network attacks, such as dictionary attacks, may easily compromise the hardware module.

SUMMARY

In one embodiment of the present invention, a processor-implemented method provides a remote diagnosis for an information appliance via a secure connection. A command is received from a console, and an examination is performed to determine whether or not the command is permitted to be issued. In response to a remote diagnostic module being initiated, a determination is made as to whether a secure connection to a remote information appliance has been created. In response to determining that the secure connection to the remote information appliance has been created, the command is transmitted to the remote information appliance via the secure connection.

In one embodiment of the present invention, a method and/or computer program product provides a remote diagnosis for an information appliance via a secure connection. A failure state of the information appliance is detected. Initiation of a remote diagnostic module is also detected. In response to detecting initiation of the remote diagnostic module, an IP address and a port number of a trusted information appliance in a predetermined delegation relationship configuration is retrieved. A data transmission path is created using the IP address and the port number of the trusted information appliance in the predetermined delegation relationship configuration, and a secure connection to the trusted information appliance is also created. A determination is made as to whether or not a local command line interface (CLI) procedure is available. In response to determining that the local command line interface (CLI) procedure is available, the secure connection is bridged to an input/output of the local CLI procedure.

The description, the appended claims, and the embodiments of the present invention further illustrate the features and advantages of the present invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1 through FIG. 4B, there are flow charts and block diagrams showing feasible structures, functions, and operations of an information appliance, a method, and a computer program product according to various embodiments of the present invention. Hence, each block in the flow charts or block diagrams may denote a module, a segment, or a portion of a program code, and includes one or more executable instructions for performing a specified logical function. In another embodiment, functions illustrated with the blocks are not necessarily performed in the sequence specified in the flow charts or block diagrams. For instance, two connected blocks as shown in the flow charts or block diagrams can also be executed simultaneously or, in some circumstances, be executed in a sequence opposite to the one specified in the flow charts or block diagrams, depending on the functions involved. Furthermore, each block in the block diagrams and/or flow charts and a combination of blocks in the block diagrams and/or flow charts can be executed by a system in a hardware serving a special purpose. Alternatively, specific functions or acts specified in each block in the block diagrams and/or flow charts and a combination of blocks in the block diagrams and/or flow charts can be performed by a combination of a hardware serving a special purpose and computer instructions.

Hardware Environment

Figure 1:
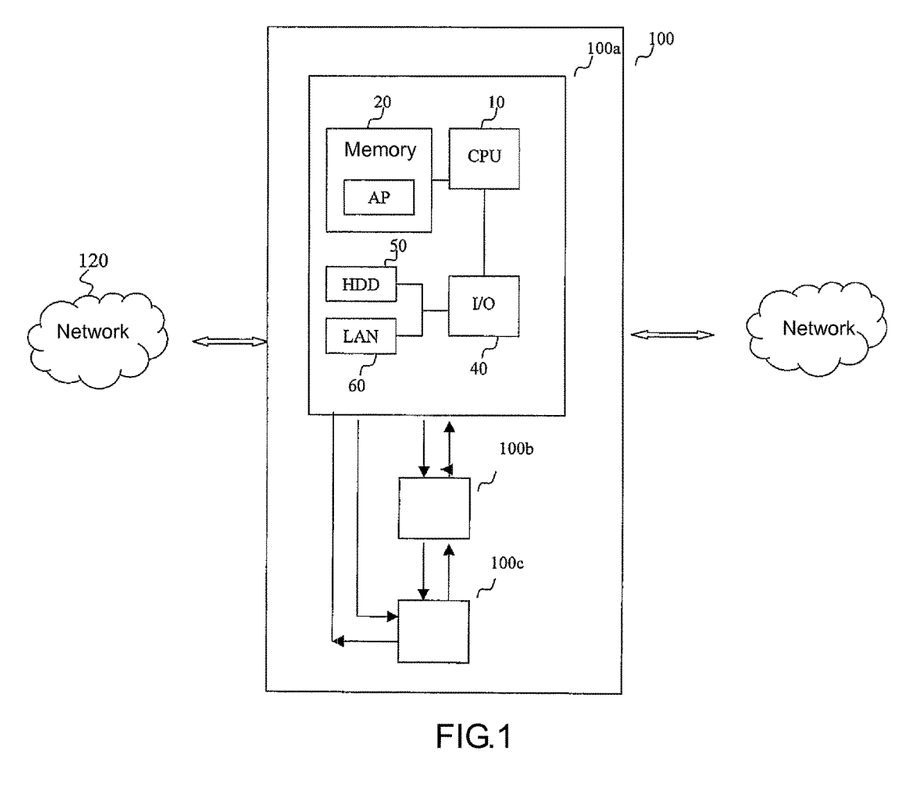
FIG. 1 is a schematic block view of the hardware environment of a cluster comprising a plurality of information appliances according to an illustrative embodiment of the present invention.

FIG. 1 is a schematic block view of the hardware environment of a cluster comprising a plurality of information appliances according to an illustrative embodiment of the present invention. In an embodiment, the cluster 100 comprises three information appliances 100a, 100b, 100c. The hardware structure of the information appliances 100a, 100b, 100c can be but is not limited to the hardware structure of IBM WebSphere DataPower Series SOA Appliances or Tivoli ISS Appliances. Each of the information appliances 100a, 100b, 100c comprises: a processor for executing a dedicated application; a storage device for storing various data and program codes; a communication and output/input device serving as an interface for communicating with a user; and a peripheral component or any component for serving any specific purpose. In another embodiment, the present invention can be achieved in another way to have many more or many fewer other devices or components. The information appliances 100a, 100b, 100c in the cluster 100 process data received from an external enterprise affiliate system (or a client computer) via a network 120 and transmit a result to a subsequent network server of an enterprise internal system for a backend application. The data comes in the form of a packet, a TCP stream, or a transaction.

Referring to FIG. 1, each of the information appliances 100a, 100b, 100c comprises a processor 10, a memory 20, and an input/output (I/O) unit 40. The input/output (I/O) bus is a high-speed serial bus, such as a PCI-e bus, and the other bus structures are also practicable. The way of connecting a component to the input/output (I/O) bus may be direct interconnection or accomplished by means of an additional card. The input/output (I/O) unit can also be coupled to a hard disk drive 50 and a local area network (LAN) adapter 60. The LAN adapter 60 allows the information appliances 100a, 100b, 100c to communicate with a client computer via the network 120. The network 120 can be carried out in any type of connection including a LAN or a wide area network (WAN) acquiring a fixed connection or temporary dial-up connection to internet through an internet service provider (ISP). The way of aforementioned connection can be wired or wireless and for example, the client computer can be communicated through a wireless network, such as GSM or Wi-Fi. However, any other hardware component or software component which is not shown, such as an additional computer system, a router, or a firewall, can be included in the network 120. The memory 20 may be a random access memory (RAM), a read-only memory (ROM), or an erasable programmable read-only memory (EPROM or flash memory). The memory 20 stores an operating system, a dedicated application, as well as program codes and various data of the main application AP of the present invention. The operating system is executed on the processor 10 to coordinate and control various components in the information appliances 100a, 100b, 100c. The processor 10 can access the memory 20 to execute the main application AP. The dedicated application comprises program codes for an information appliance designed to serve a specific purpose or provide a specific service so as to conduct a specific transaction such that the received data can be processed.

The main application AP comprises a diagnostic module and a role-based management module of the present invention. The role-based management module comprises a conventional AAA module and a delegated access module of the present invention. The diagnostic module and the role-based management module include a program module and instructions so as to implement a method of providing a remote diagnosis via a secure connection according to the present invention. The diagnostic module and the role-based management module can be provided in the form of a module in the application or a daemon. However, in another embodiment, the diagnostic module and the role-based management module can be provided in the form of another kind of program. The diagnostic module and the role-based management module comprise a code for performing the procedures illustrated with FIGS. 4A, 4B and described herein.

Persons skilled in the art understand that the hardware components of the information appliances 100a, 100b, 100c depicted in FIG. 1 can vary in another embodiment. Any other internal hardware or peripheral devices, such as a flash read-only memory (flash ROM), an equivalent non-volatile memory, or a CD-ROM drive can be substituted for or added to the hardware components depicted in FIG. 1.

Figure 2:
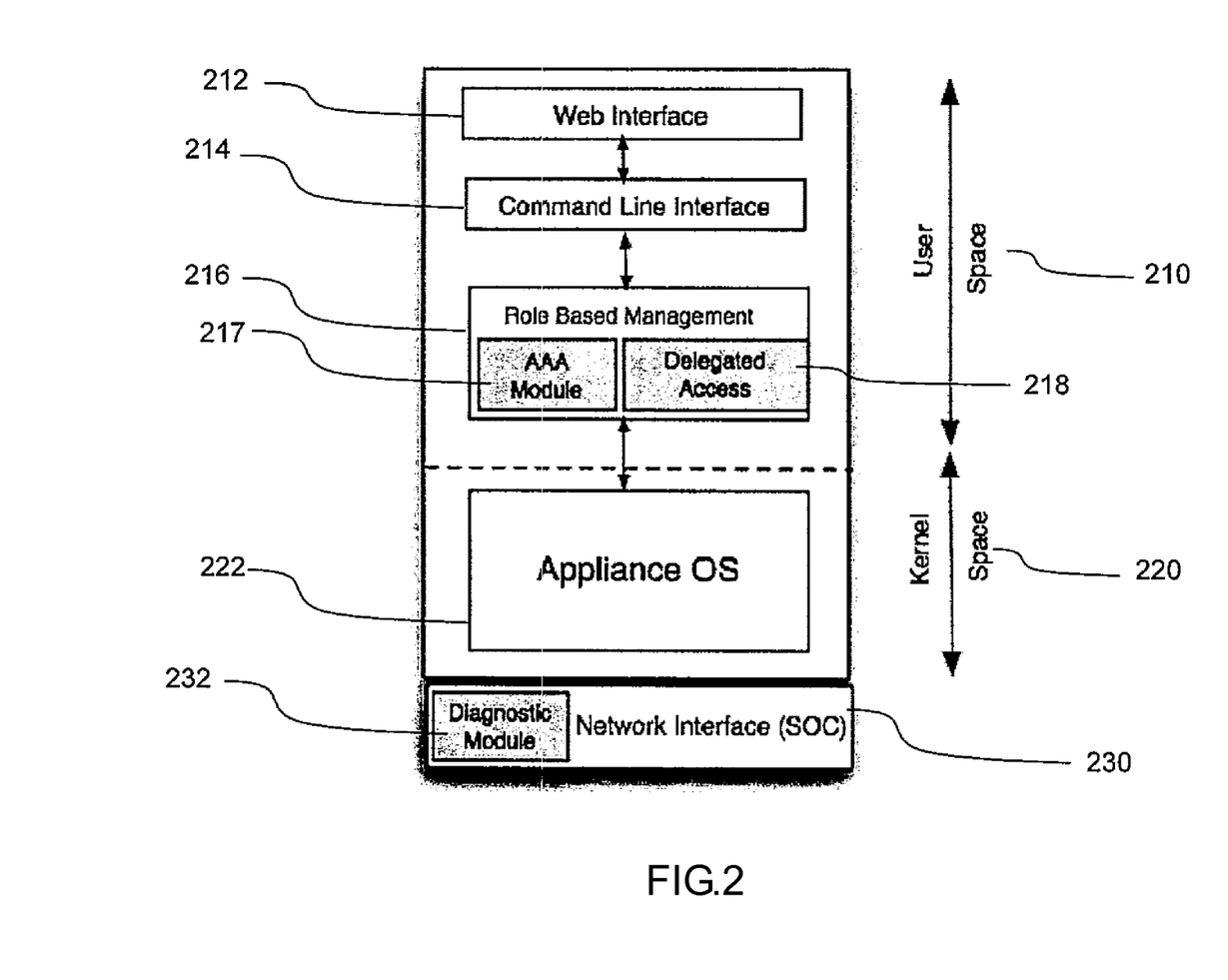
FIG. 2 is a schematic view of system framework of an information appliance according to an embodiment of the present invention.

FIG. 2 is a schematic view of system framework of an information appliance according to an embodiment of the present invention. The system framework of the information appliance comprises the system of the information appliance and a network interface card 230.

The system comprises an information appliance operating system 222 located at a kernel space 220, and a web interface 212, a command line interface (CLI) 214 and a role-based management (RBM) module 216 located at a user space 210. The RBM module 216 comprises a conventional AAA module 217 and a delegated access module 218 of the present invention.

The AAA module 217 performs an authentication examination to determine whether a user who wants to log in is permitted to access the information appliance and then to examine whether the authenticated user is permitted (i.e., authorized) to issue a command. For instance, the network system administrator creates a user regarded as "backup user" which can only issue a system support-related command provided by the information appliance operating system 222. The AAA module 217 is based on a prior art.

The information appliance operating system 222 provides a set of commands which can be used in the network interface 212 and the CLI 214. Both the network interface 212 and the CLI 214 are used by a client access program of the information appliance to execute a command provided by the system. The client access program may be a network browser, a secure shell (ssh) terminal program, or a console used for a serial port. Upon execution of the command, the RBM module 216 performs a security examination before transmitting the command to the information appliance operating system 222.

The delegated access module 218 is one of the kernel components of the present invention and is provided on a system so as for a user to control another system (or information appliance) via a network. When a system (or information appliance) configures an access delegation relationship during an execution session, the information appliance creates a secure connection (such as a TCP/IP connection) to a trusted system (or information appliance) in the same cluster (or network segment). When the information appliance enters a failure state (for example, in case of a crash or a kernel panic or in the event that a kernel procedure cannot be restarted), a diagnostic module 232 detects that the system is confronted with a problem and creates a secure connection to the trusted system (or information appliance). Afterward, a command (usually a diagnosis-related command) is executed on the trusted system by the network system administrator and then examined by the AAA module 217. Eventually, the command is transmitted to the failed system (or information appliance) via the secure TCP/IP connection.

The network interface card 230 comprises a TCP/IP stack and thus is capable of creating a TCP/IP connection regardless of irrelevant to the operating system of the information appliance. A network interface card 230 is usually embodied as a system on chip (SOC) or an application-specific integrated circuit (ASIC). The network interface card 230 further comprises a diagnostic module 232. The diagnostic module 232 is another kernel component of the present invention. The diagnostic module 232 is used for creating a secure connection to a trusted system (or information appliance). When the network system administrator enables the delegated access function, both the port number and IP address of the system (or information appliance) are transmitted to the diagnostic module 232 to create a data transmission path, and thus the diagnostic module 232 knows which system (or information appliance) in the same cluster (or network segment) is trusted. If the system (or information appliance) enters a failure state, the diagnostic module 232 will create a secure connection to the trusted system. The failed system (or information appliance) receives a diagnosis-related command from the trusted system, and the diagnostic module 232 directs all input/output received/issued via a network in order to control the transmission of all input/output received/issued via the network. Hence, the administrator is able to execute a remote diagnosis procedure.

If the system (or information appliance) enters a failure state, it may be determined whether the procedure of the CLI 214 of the failed system (or information appliance) can be initiated on the basis of the degree of failure of the system.

1) If the failed system (or information appliance) can still initiate its CLI (i.e., the failed system is still available), a troubleshooting command issued by the trusted system (or information appliance) to the failed target device will be directly directed to the CLI procedure of the target device, that is, the troubleshooting command will be forwarded to the CLI procedure of the target device.

2) If the CLI of the failed system cannot be initiated (i.e., is unavailable), the network interface card of the failed system will redirect the conventional administrative port or serial port, which is provided for the network system administrator's diagnosis of a system-related problem, to the trusted system. That is to say, the conventional administrative port or serial port for the network system administrator's diagnosis of a system-related problem is used to receive a command from the trusted information appliance in order to diagnose and troubleshoot the system-related problem of the failed target device such that the administrator can execute a remote troubleshooting procedure. For more details of the diagnostic module 232 and the delegated access module 218, FIGS. 4A, 4B and a related description below can be referred to.

Example of a Preferred Embodiment

Figure 3A:
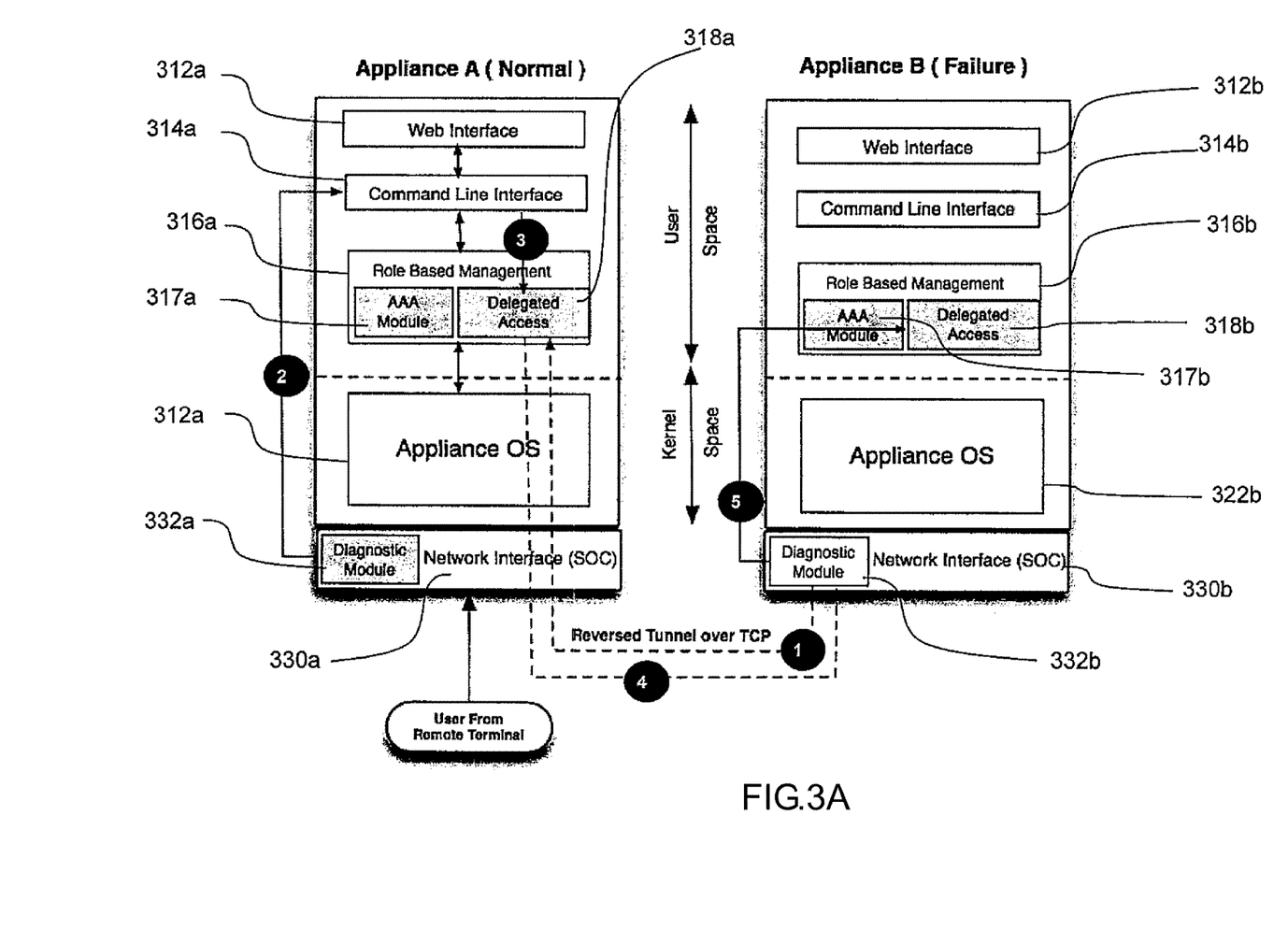
FIG. 3A is a schematic view of the information process flow in an example according to an embodiment of the present invention.

FIG. 3A is a schematic view of the information process flow in an example according to an embodiment of the present invention. As shown in FIG. 3A, there are a functioning and trusted information appliance A and a failed information appliance B, each of which has the components shown in FIG. 2 and not described again for the sake of brevity. When information appliance B fails, the processing flow in an example according to an embodiment of the present invention is described as follows:

1) First, if the information appliance B fails, a secure TCP/IP connection between a diagnostic module 332b of the information appliance B and the trusted information appliance A will be created such that a delegated access module 318a of the information appliance A can detect the status of the information appliance B. In general, the connection between two information appliances is encrypted by RSA key pair.

2) A network system administrator (or user) logs in a console of a CLI 314a of the information appliance A. The administrator can select a remote diagnosis mode.

3) The administrator inputs a command which is usually a diagnosis-related command. The command is examined by an AAA module 317a of the information appliance A. For example, it is determined whether the administrator who wants to log in is permitted to access the information appliance, and then it is examined whether the authenticated user is permitted (i.e., authorized) to issue the command. Once the command passes the examination, the delegated access module 318a of the information appliance A will create an underlying input/output connection for transmitting the command.

4) The command is transmitted to the diagnostic module 332b of the information appliance B via the secure TCP/IP connection.

5) If the kernel procedure (including a CLI 314b) of the information appliance B can still be initiated, the command can be directly transmitted to a delegated access module 318b of the information appliance B and executed by an operating system 322b of the information appliance B.

If the kernel procedure of the information appliance B cannot be initiated (because of a kernel panic, for example), the conventional administrative port or serial port, which is provided by a network interface card 330b of the information appliance B and used for the network system administrator's diagnosis of a system-related problem, will be used to receive a command from the trusted information appliance in order to diagnose and troubleshoot a system-related problem of the failed target device.

Figure 3B:
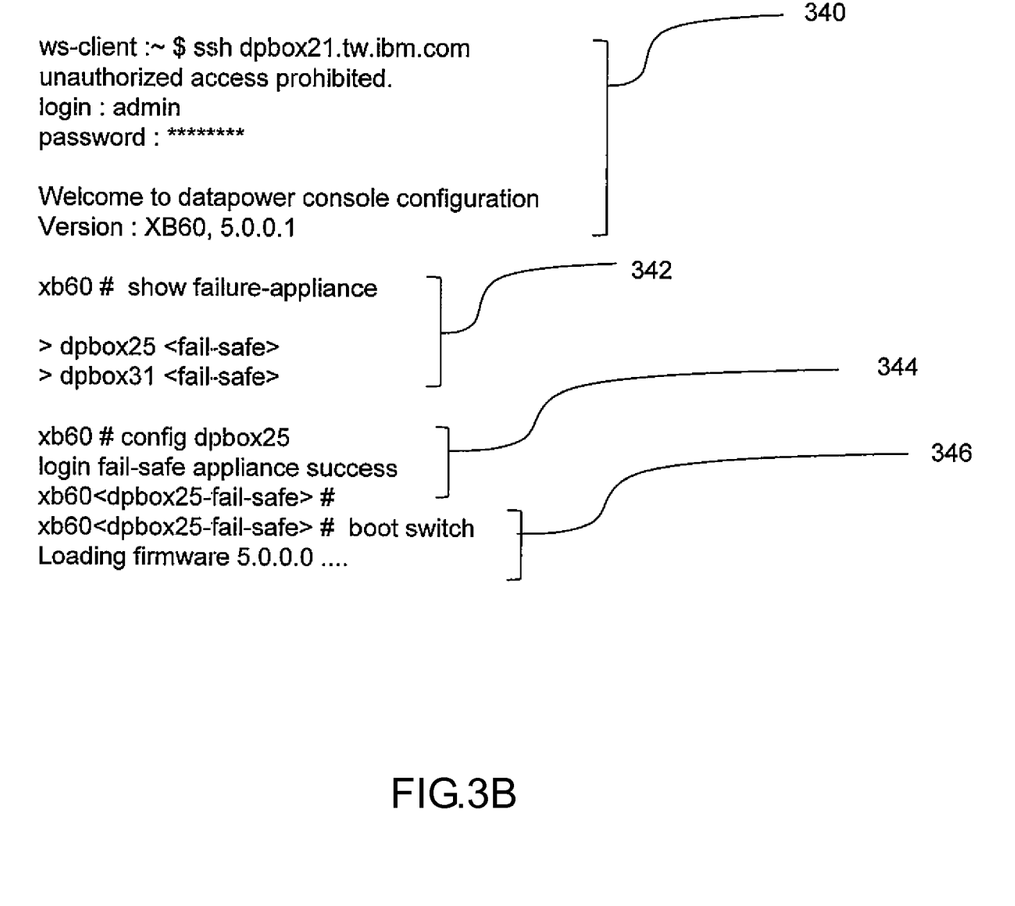
FIG. 3B is a schematic view of a console by means of which the network system administrator proceeds to diagnosis or troubleshoot via the CLI of a trusted system (or information appliance) in an example according to an embodiment of the present invention.

FIG. 3B is a schematic view of a console by means of which the network system administrator proceeds to diagnosis or troubleshoot via the CLI of a trusted system (or information appliance) in an example according to an embodiment of the present invention. First, a network system administrator logs in a trusted information appliance (dpbox21) by means of an ssh terminal program at 340. After logging in, behind the prompt (xb60#) the administrator inputs the code name of a failed information appliance shown in the same cluster (or network segment) at 342. As illustrated, the trusted information appliance (dpbox21) receives two failed information appliances (dpbox25, dpbox31). Afterward, the administrator switches the CLI to the failed information appliance (dpbox25) at 344 and then the prompt (xb60<dpbox25-fail-safe>#) is shown instantly. Finally, the administrator executes a troubleshooting instruction and thus restarts to load the old version of firmware (5.0.0.0 . . . ) at 346.

Diagnostic Module 232

Figure 4A:
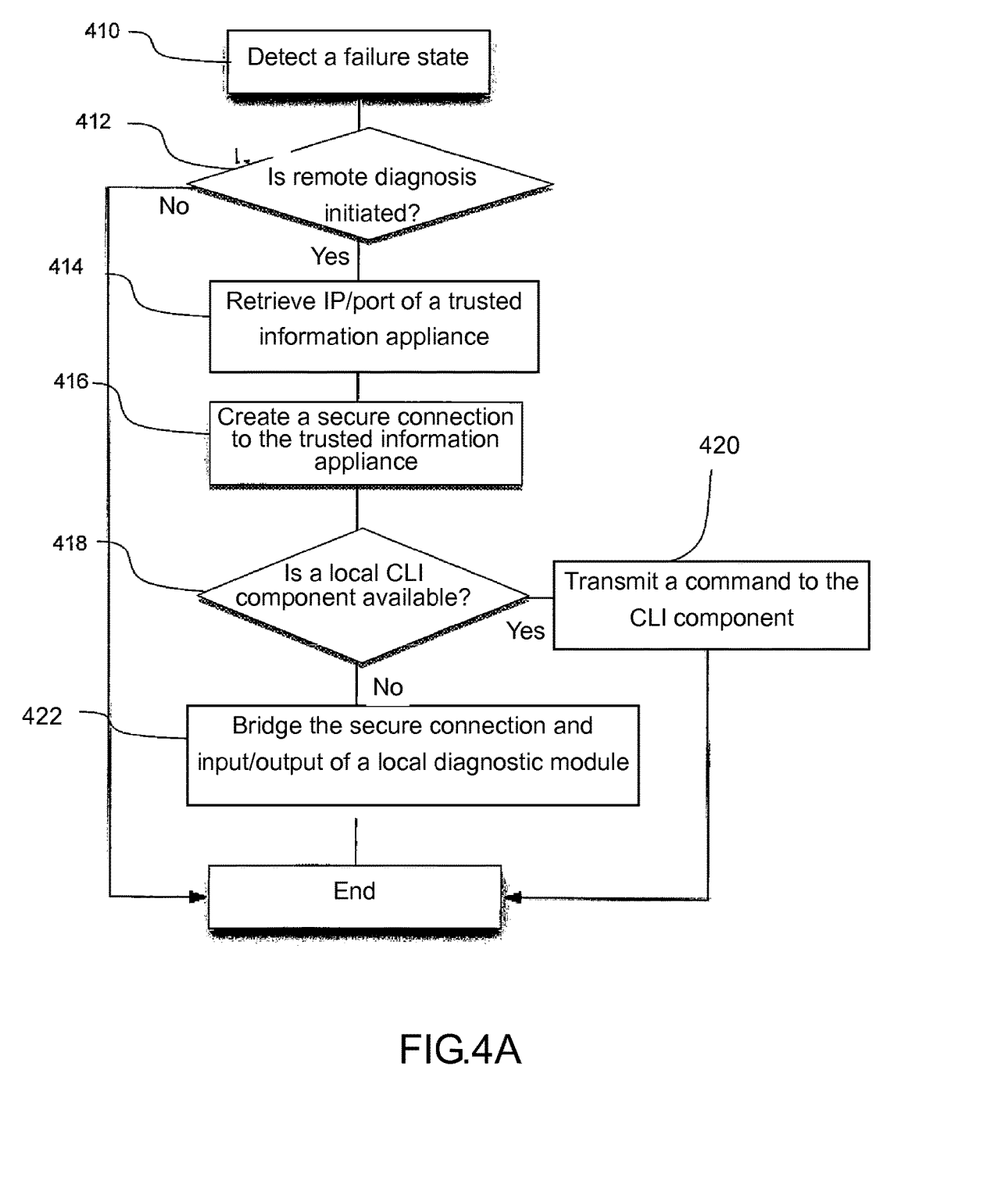
FIG. 4A is a flow chart of operation of a diagnostic module according to an embodiment of the present invention.

FIG. 4A is a flow chart of operation of a diagnostic module according to an embodiment of the present invention.

Step 410: the information appliance detects a failure state.

Step 412: determine whether a remote diagnostic module has been initiated.

Step 414: retrieve an IP address and a port number of a trusted information appliance in a predetermined delegation relationship configuration, so as to create a data transmission path.

Step 416: create a secure connection to the trusted information appliance.

Step 418: determine whether a local CLI component (procedure) is available.

Step 420: bridge the secure connection (such as TCP/IP connection) and input/output of the local CLI component if the local CLI component (procedure) is available. That is, a command is transmitted to the CLI component.

Step 422: bridge the secure connection and input/output of a local administrative port if the local CLI component (procedure) is unavailable. The network interface card of the failed information appliance redirects the conventional administrative port or serial port, which is provided for the network system administrator's diagnosis of a system-related problem, to the trusted information appliance. That is to say, the conventional administrative port or serial port, which is provided by the failed information appliance and used for the network system administrator's diagnosis of a system-related problem, will be used to receive a command from the trusted information appliance in order to diagnose and troubleshoot a system-related problem with the failed target device.

Role-Based Management (RBM) Module

Figure 4B:
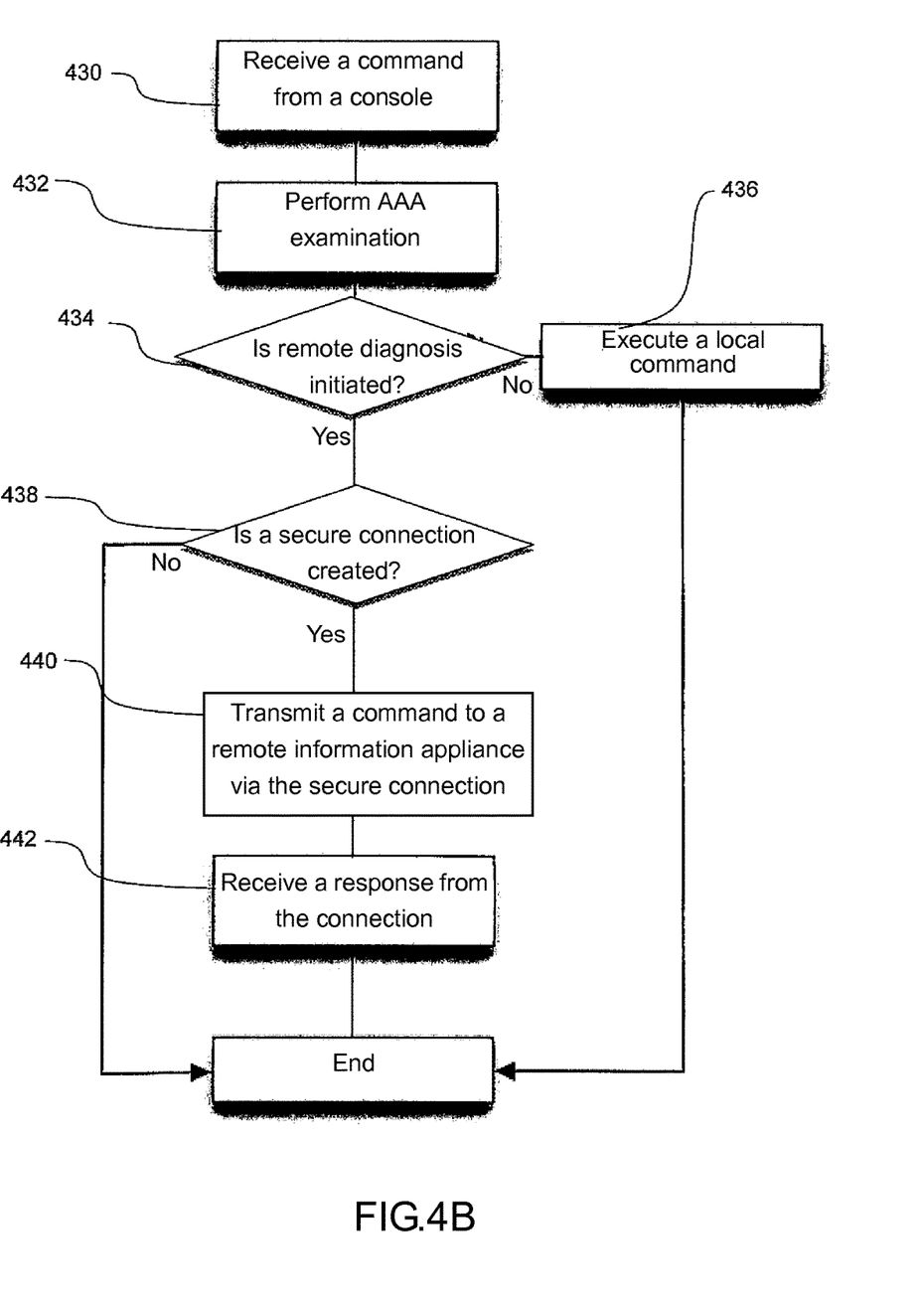
FIG. 4B is a flow chart of operation of a role-based management (RBM) module according to an embodiment of the present invention.

FIG. 4B is a flow chart of operation of a role-based management (RBM) module according to an embodiment of the present invention. As mentioned before, the diagram also shows a conventional AAA module and a delegated access module.

Step 430: receive a command from a console.

Step 432: the conventional AAA module examines the command. For example, it is determined whether the administrator who wants to log in is permitted to access the information appliance and then it is examined whether the authenticated user is permitted to issue the command.

Step 434: determine whether a remote diagnostic module has been initiated.

Step 436: treat the command as a local command and execute it if no remote diagnostic module has been initiated (i.e., the command received is not used in a remote diagnosis).

Step 438: determine, when a remote diagnostic module has been initiated, whether a secure connection (such as a TCP/IP connection) to a remote information appliance has been created.

Step 440: transmit, if the secure connection has been created, the command to the remote information appliance via the secure connection.

Step 442: receive a response from the secure connection.

A method and a computer program product for providing a remote diagnosis for an information appliance via a secure connection and an information appliance for performing the method are presented. The method comprises the following steps: receiving a command from a console; executing an authentication/authorization/auditing (AAA) module to examine the command; determining, in response to the initiating of a remote diagnostic module, whether a secure connection to a remote information appliance has been created; and transmitting the command to the remote information appliance via the secure connection.

The present invention discloses that a remote diagnostic mechanism with a secure connection is executed by a functioning and trusted peer information appliance. The functioning peer information appliance serves as a communication bridge by which a secure network connection between a local client application and a remote failed information appliance (or known as a target device) is created. The failed target device actively creates a connection to the functioning peer information appliance to not only avoid unnecessary polling but also prevent hackers from creating any false connection to any functioning device in an attempt to gain control.

Both the bridging information appliance and the target device are located at the same network segment or belong to the same cluster, and the secure network connection created between the two information appliances according to the present invention is created regardless of any operating system. Accordingly, the remote diagnostic mechanism is practicable. Furthermore, by means of the bridging information appliance and an authentication/authorization/auditing (AAA) module of the role-based management (RBM) module of the target device, the remote diagnostic mechanism can provide fine-grained access control over a diagnostic operation. In general, the auditing, which is also known as accounting, means to follow up with user's behavior.

All kinds of access controls (including authentication/authorization control) can be performed on the functioning information appliance. If the failed target device is still able to initiate its command line interface (CLI) (i.e., the failed target device is still available), a troubleshooting command issued by the functioning information appliance to the failed target device can be directly forwarded to the CLI of the target device. When the CLI of the failed target device cannot be initiated (i.e., is unavailable), the conventional administrative port or serial port, which is provided by the network interface card of the failed target device and used for the network system administrator's diagnosis of a system-related problem, will be used in diagnosing a system-related problem of the failed target device.

However, the remote diagnostic mechanism at least has the following advantages:

1. A trusted bridging information appliance renders a remote diagnosis practicable, and the bridging information appliance is usually accessible via the Internet; and 2. Due to the similarity between the bridging information appliance and the target device, it is practicable to minimize the difficulty in the synchronization and communication between the bridging information appliance and the target device.

According to an embodiment of the present invention, a method of providing a remote diagnosis for an information appliance via a secure connection is disclosed. The method comprising the following steps: receiving a command from a console; executing an authentication/authorization/auditing (AAA) module to examine the command; determining, when a remote diagnostic module has been initiated, whether a secure connection to a remote information appliance has been created; and transmitting the command to the remote information appliance via the secure connection.

According to an embodiment of the present invention, a method of providing a remote diagnosis for an information appliance via a secure connection is disclosed. The method comprising the following steps: detecting a failure state; retrieving, if a remote diagnostic module has been initiated, an IP address and a port number of a trusted information appliance in a predetermined delegation relationship configuration, so as to create a data transmission path; creating a secure connection to the trusted information appliance; and bridging, if a local command line interface (CLI) procedure is available, the secure connection and input/output of the local CLI procedure.

According to an embodiment of the present invention, a computer program product comprising a computer-readable medium having a program code stored therein is disclosed. When the computer program product is executed on an information appliance, the aforementioned method is implemented for providing a remote diagnosis via a secure connection.

According to an embodiment of the present invention, an information appliance is disclosed. The information appliance comprises: a bus; a memory connected to the bus, wherein the memory comprises a set of instructions; and a processing unit connected to the bus, wherein the processing unit executes the set of instructions to implement the aforementioned method for providing a remote diagnosis via a secure connection.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

As mentioned before, the present invention is characterized in that the bridging information appliance and the AAA module of the role-based management (RBM) module of the target device together allow the remote diagnostic mechanism to perform detailed access control over a diagnostic operation. As mentioned before, if the system (or information appliance) enters a failure state, it may be determined whether the CLI procedure of the failed system (or information appliance) can be initiated on the basis of the degree of failure of the system. In practice, depending on the degree of failure of the system, the present invention offers the alternatives to perform diagnosis and troubleshooting.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

What is claimed is:

1. A method of providing a remote diagnosis for an information appliance via a secure connection, the method comprising:

detecting, by one or more hardware processors, a failure in a failed information appliance;

responsive to detecting the failure in the failed information appliance, creating, by use of a diagnostic module in a hardware network interface card (NIC) on the failed information appliance, a secure connection between the failed information appliance and a trusted information appliance, wherein the diagnostic module provides a diagnosis of the failure to the trusted information appliance via the secure connection;

transmitting, by one or more hardware processors, a command from the trusted information appliance, wherein the command is a command to diagnose the failure in the failed information appliance;

determining, by one or more hardware processors, whether the command is input into the trusted information appliance from an authorized user;

responsive to determining that the command is input into the trusted information appliance from the authorized user, creating, by one or more hardware processors, an input/output connection at the trusted information appliance for transmitting the command to the diagnostic module in the hardware NIC on the failed information appliance;

responsive to a determination that the secure connection to the remote information appliance has been created, transmitting, by one or more hardware processors, the command from the trusted information appliance to the diagnostic module in the failed information appliance via the secure connection;

determining, by one or more hardware processors, whether a command line interface (CLI) component on the failed information appliance is unavailable;

responsive to a determination that the CLI component on the failed information appliance is unavailable, transmitting, from the trusted information appliance to an administrative port on the hardware network interface card (NIC) on the failed information appliance, a diagnostic command for diagnosing a system-related problem with the failed information appliance; and using, by the trusted information appliance, the diagnosis information to remotely correct a fault in the failed information appliance that caused the failure in the failed information appliance.

2. The method of claim 1, wherein the secure connection is a TCP/IP connection that is protected by encryption.

3. The method of claim 1, wherein the failure of the failed information appliance is an inability of a kernel procedure in the failed information appliance to be restarted.

4. The method of claim 1, further comprising:
receiving, by one or more hardware processors, a response from the failed information appliance via the secure connection.

5. The method of claim 1, further comprising:
determining, by one or more hardware processors, whether a kernel procedure on the failed information appliance is functional; and
responsive to a determination that the kernel procedure on the failed information appliance is functional, directly transmitting the command from the trusted information appliance to a delegated access module on the failed information appliance for execution by an operating system on the failed information appliance.

6. The method of claim 1, further comprising:
determining, by one or more hardware processors, whether a kernel procedure on the failed information appliance cannot be initiated; and
responsive to a determination that the kernel procedure on the failed information appliance cannot be initiated, transmitting the command from the trusted information appliance to a network interface card on the failed information appliance for execution by an operating system on the failed information appliance.

7. The method of claim 1, further comprising:
determining, by one or more hardware processors, whether a command line interface (CLI) component on the failed information appliance is available; and
responsive to a determination that the CLI component on the failed information appliance is available, transmitting the command from the trusted information appliance to a CLI component on the failed information appliance for execution by an operating system on the failed information appliance.

8. A computer program product for providing a remote diagnosis for an information appliance via a secure connection, the computer program product comprising a computer readable storage medium having program instructions embodied therewith, the program instructions readable and executable by a processor to cause the processor to:
detect a failure in a failed information appliance;

responsive to detecting the failure in the failed information appliance, create, by use of a diagnostic module in a hardware network interface card (NIC) on the failed information appliance, a secure connection between the failed information appliance and a trusted information appliance, wherein the diagnostic module provides a diagnosis of the failure to the trusted information appliance via the secure connection;

transmit a command from the trusted information appliance, wherein the command is a command to diagnose the failure in the failed information appliance;

determine whether the command is input into the trusted information appliance from an authorized user;

responsive to determining that the command is input into the trusted information appliance from the authorized user, create an input/output connection at the trusted information appliance for transmitting the command to the diagnostic module in the hardware NIC on the failed information appliance;

responsive to a determination that the secure connection to the remote information appliance has been created, transmit the command from the trusted information appliance to the diagnostic module in the failed information appliance via the secure connection;

determine whether a command line interface (CLI) component on the failed information appliance is unavailable;

responsive to a determination that the CLI component on the failed information appliance is unavailable, transmit, from the trusted information appliance to an administrative port on the hardware network interface card (NIC) on the failed information appliance, a diagnostic command for diagnosing a system-related problem with the failed information appliance; and use, by the trusted information appliance, the diagnosis information to remotely correct a fault in the failed information appliance that caused the failure in the failed information appliance.

9. A system comprising:
one or more processors;
one or more computer readable memories operably coupled to the one or more processors; one or more computer readable storage mediums operably coupled to the one or more computer readable memories; and
program instructions stored on at least one of the one or more computer readable storage mediums for execution by at least one of the one or more processors via at least one of the one or more computer readable memories, the program instructions comprising:
program instructions to detect a failure in a failed information appliance;
program instructions to, responsive to detecting the failure in the failed information appliance, create, by use of a diagnostic module in a hardware network interface card (NIC) on the failed information appliance, a secure connection between the failed information appliance and a trusted information appliance, wherein the diagnostic module provides a diagnosis of the failure to the trusted information appliance via the secure connection;
program instructions to transmit a command from the trusted information appliance, wherein the command is a command to diagnose the failure in the failed information appliance;
program instructions to determine whether the command is input into the trusted information appliance from an authorized user;

program instructions to, responsive to determining that the command is input into the trusted information appliance from the authorized user, create an input/output connection at the trusted information appliance for transmitting the command to the diagnostic module in the hardware NIC on the failed information appliance;

program instructions to, responsive to a determination that the secure connection to the remote information appliance has been created, transmit the command from the trusted information appliance to the diagnostic module in the failed information appliance via the secure connection;

program instructions to determine whether a command line interface (CLI) component on the failed information appliance is unavailable;

program instructions to, responsive to a determination that the CLI component on the failed information appliance is unavailable, transmit, from the trusted information appliance to an administrative port on the hardware network interface card (NIC) on the failed information appliance, a diagnostic command for diagnosing a system-related problem with the failed information appliance; and program instructions to use, by the trusted information appliance, the diagnosis information to remotely correct a fault in the failed information appliance that caused the failure in the failed information appliance.

* * * * *